(12) United States Patent
Nishida (10) Patent No.: US 7,804,285 B2
(45) Date of Patent: Sep. 28, 2010

(54) CONTROL OF OPERATION OF SWITCHING REGULATOR TO SELECT PWM CONTROL OR PFM CONTROL BASED ON PHASE COMPARISON

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 512 days.

(21) Appl. No.: 11/897,286

(22) Filed: Aug. 29, 2007

(65) Prior Publication Data

US 2008/0061758 A1    Mar. 13, 2008

(30) Foreign Application Priority Data

Sep. 12, 2006    (JP) .............................. 2006-246784

(51) Int. Cl.
*G05F 1/575*    (2006.01)
(52) U.S. Cl. ...................................... 323/284; 323/285
(58) Field of Classification Search ................ 323/284, 323/282–283, 285–286; 332/112–113
See application file for complete search history.

(56) References Cited

U.S. PATENT DOCUMENTS 7,109,688 B1*    9/2006    Chiu et al. .................. 323/222

2005/0258808 A1*    11/2005    Chen et al. .................. 323/222

FOREIGN PATENT DOCUMENTS

| JP | 3647811 | 2/2005 |
| JP | 2006-137611 | 6/2006 |

* cited by examiner

*Primary Examiner*—Harry Behm
(74) *Attorney, Agent, or Firm*—Cooper & Dunham LLP (57) ABSTRACT

A switching regulator is disclosed that includes a switching transistor; an inductor; a voltage comparator circuit part comparing a voltage at the connection of the switching transistor and the inductor and a predetermined voltage and outputting a first signal; a phase comparator circuit part comparing the phases of a control signal input to the switching transistor and the output first signal and outputting a second signal; and a control circuit part performing PWM control or PFM/VFM control on the switching transistor in accordance with the output second signal so that a predetermined constant voltage is output from the switching regulator. The control circuit part performs PWM control if the output second signal indicates that the control signal and the output first signal are in phase, and performs PFM/VFM control if the output second signal indicates that the control signal and the output first signal are out of phase.

21 Claims, 4 Drawing Sheets

CONTROL OF OPERATION OF SWITCHING REGULATOR TO SELECT PWM CONTROL OR PFM CONTROL BASED ON PHASE COMPARISON

BACKGROUND

1. Technical Field

This disclosure relates generally to switching regulators, control circuits thereof, and methods of controlling operations thereof, and more particularly to a switching regulator configured to switch between PWM control and PFM or VFM control in accordance with load conditions, a control circuit of the switching regulator, and a method of controlling the operation of the switching regulator.

2. Description of the Related Art

In these years, environmental concerns have required electronic apparatuses to reduce power consumption. This tendency is particularly notable in battery-driven electronic apparatuses. Generally speaking, for power savings, it is important to reduce power consumed in electronic apparatuses and to reduce unnecessary power consumption by improving the efficiency of power supply circuits themselves.

Non-isolated switching regulators using an inductor are popular as high-efficiency power supply circuits for small-size electronic apparatuses. Roughly speaking, three methods are known as control methods of switching regulators.

The first one is PWM (Pulse Width Modulation) control that keeps output voltage constant by varying the duty cycle of clock pulses of a fixed frequency. The second one is PFM (Pulse Frequency Modulation) control that keeps output voltage constant by varying a clock cycle with a fixed pulse width. The third one is VFM (Variable Frequency Modulation) control that keeps output voltage constant by controlling clock output of a fixed pulse width in accordance with output voltage error.

There are two types of PFM control: one is to vary frequency in a stepless manner and the other is to vary frequency in a pseudo manner by thinning out a clock signal of a frequency used in PFM control.

In PWM control, on-off control of a switching transistor is performed at a constant frequency even with a light load. Accordingly, PWM control suffers from degraded efficiency at a light-load time when the current output to a load is small. Meanwhile, in PFM control or VFM control, the frequency of a signal to cause switching of the switching transistor varies in accordance with a connected load. Accordingly, PFM control or VFM control is more efficient for a light load than PWM control although there is a considerable effect of noise or ripple on devices.

For the foregoing reasons, conventionally, improvement in power supply efficiency is achieved for a light load through a heavy load by switching between PWM control and PFM control or switching between PWM control and VFM control in accordance with load conditions.

In general, the load condition is detected by inserting a resistor for output current detection between a supply voltage forming an input voltage and an output terminal and detecting an output current from the output terminal. According to this method, however, power loss due to the resistor for output current detection increases as the output current increases. Accordingly, this method is not suitable for small electronic devices using a battery as a power supply. Therefore, a method that indirectly detects a load condition using the voltage level of an error amplifier circuit is proposed as a method that does not use a resistor for output current detection. (See, for example, Patent Document described below.)

[Patent Document] Japanese Patent No. 3647811

However, an integrating circuit for eliminating the effect of a ripple component superposed on output voltage is attached to the error amplifier circuit.

Usually, the integrating circuit is added to the error amplifier circuit as a phase compensator circuit, and is optimized for the operating frequency used at the time of PWM control. Therefore, when the operating frequency becomes lower than at the time of PWM control (or the pulses of a pulse signal for PWM control are thinned out) as in the case of PFM control, the output of the integrating circuit, which is a differential error output, effectively functions immediately after a switching operation, but the output voltage of the error amplifier circuit becomes 0 V or equal to a supply voltage level and does not effectively function as a load current detection signal when the switching operation is stopped because of, for example, thinning out the pulses of a pulse signal for PWM control.

Accordingly, at the time of PFM control, the output voltage of the error amplifier circuit cannot be kept constant with respect to a load current, so that the relationship between the output voltage of the error amplifier circuit and the load current becomes variable. This causes a problem in that the load current at the switching time of control methods cannot be determined with accuracy compared with the method that measures the load current using a resistor for output current detection.

SUMMARY

In an aspect of this disclosure, there are provided a switching regulator capable of accurately setting or determining a load current at the time of switching between PWM control and PFM or VFM control in accordance with a load condition without using a resistor for output current detection, a control circuit thereof, and a method of controlling an operation thereof.

In another aspect, there is provided a switching regulator converting a voltage input to an input terminal into a predetermined constant voltage and outputting the converted voltage from an output terminal, the switching regulator including: a switching transistor configured to perform switching in accordance with an input control signal; an inductor charged with the input voltage by the switching of the switching transistor; a voltage comparator circuit part configured to compare a voltage at a connection of the switching transistor and the inductor and a predetermined voltage, and to generate and output a binary signal indicating a result of the comparison; a phase comparator circuit part configured to compare a phase of the control signal input to a control electrode of the switching transistor and a phase of the output signal of the voltage comparator circuit part, and to generate and output a signal indicating a result of the comparison; and a control circuit part configured to perform one of a first control and a second control on the switching transistor in accordance with the output signal of the phase comparator circuit part so that the output voltage output from the output terminal is the predetermined constant voltage, the first control being PWM control and the second control being one of PFM control and VFM control, wherein the control circuit part is configured to perform the PWM control in response to the output signal of the phase comparator circuit part indicating that the control signal and the output signal of the voltage comparator circuit part are in phase, and to perform the one of the PFM control and the VFM control in response to the output signal of the phase comparator circuit part indicating that the control signal and the output signal of the voltage comparator circuit part are out of phase.

In another aspect of this disclosure, there is provided a control circuit of a switching regulator, the switching regulator converting a voltage input to an input terminal into a predetermined constant voltage and outputting the converted voltage from an output terminal, the switching regulator including a switching transistor performing switching in accordance with an input control signal; and an inductor charged with the input voltage by the switching of the switching transistor, wherein the switching of the switching transistor is controlled so that the output voltage output from the output terminal is the predetermined constant voltage, the control circuit including a voltage comparator circuit part configured to compare a voltage at a connection of the switching transistor and the inductor and a predetermined voltage, and to generate and output a binary signal indicating a result of the comparison; a phase comparator circuit part configured to compare a phase of the control signal input to a control electrode of the switching transistor and a phase of the output signal of the voltage comparator circuit part, and to generate and output a signal indicating a result of the comparison; and a control circuit part configured to perform one of a first control and a second control on the switching transistor in accordance with the output signal of the phase comparator circuit part so that the output voltage output from the output terminal is the predetermined constant voltage, the first control being PWM control and the second control being one of PFM control and VFM control, wherein the control circuit part is configured to perform the PWM control in response to the output signal of the phase comparator circuit part indicating that the control signal and the output signal of the voltage comparator circuit part are in phase, and to perform the one of the PFM control and the VFM control in response to the output signal of the phase comparator circuit part indicating that the control signal and the output signal of the voltage comparator circuit part are out of phase.

In another aspect of this disclosure, there is provided a method of controlling an operation of a switching regulator, the switching regulator converting a voltage input to an input terminal into a predetermined constant voltage and outputting the converted voltage from an output terminal, the switching regulator including a switching transistor performing switching in accordance with an input control signal; and an inductor charged with the input voltage by the switching of the switching transistor, wherein the switching of the switching transistor is controlled so that the output voltage output from the output terminal is the predetermined constant voltage, the control method including steps of (a) comparing a voltage at a connection of the switching transistor and the inductor and a predetermined voltage; (b) comparing a phase of the control signal input to a control electrode of the switching transistor and a phase of a binary signal indicating a result of step (a); and (c) performing PWM control on the switching transistor in response to a result of step (b) indicating that the control signal and the binary signal are in phase, and performing one of PFM control and VFM control in response to the result of step (b) indicating that the control signal and the binary signal are out of phase.

According to various embodiments of a switching regulator, control circuit thereof, and method of controlling an operation thereof, a voltage at the connection of a switching regulator and an inductor is compared with a predetermined voltage, and the phase of a control signal input to the control electrode of the switching transistor is compared with the phase of a binary signal indicating the result of the voltage comparison. If the control signal and the binary signal are in phase, PWM control is performed on the switching transistor. If the control signal and the binary signal are out of phase, PFM control or VFM control is performed on the switching transistor. As a result, a load current at the time of switching between PWM control and PFM or VFM control in accordance with a load condition can be set or determined with accuracy without using a resistor for output current detection.

BRIEF DESCRIPTION OF THE DRAWINGS

Other aspects, features and advantages will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

First Embodiment

Figure 1:
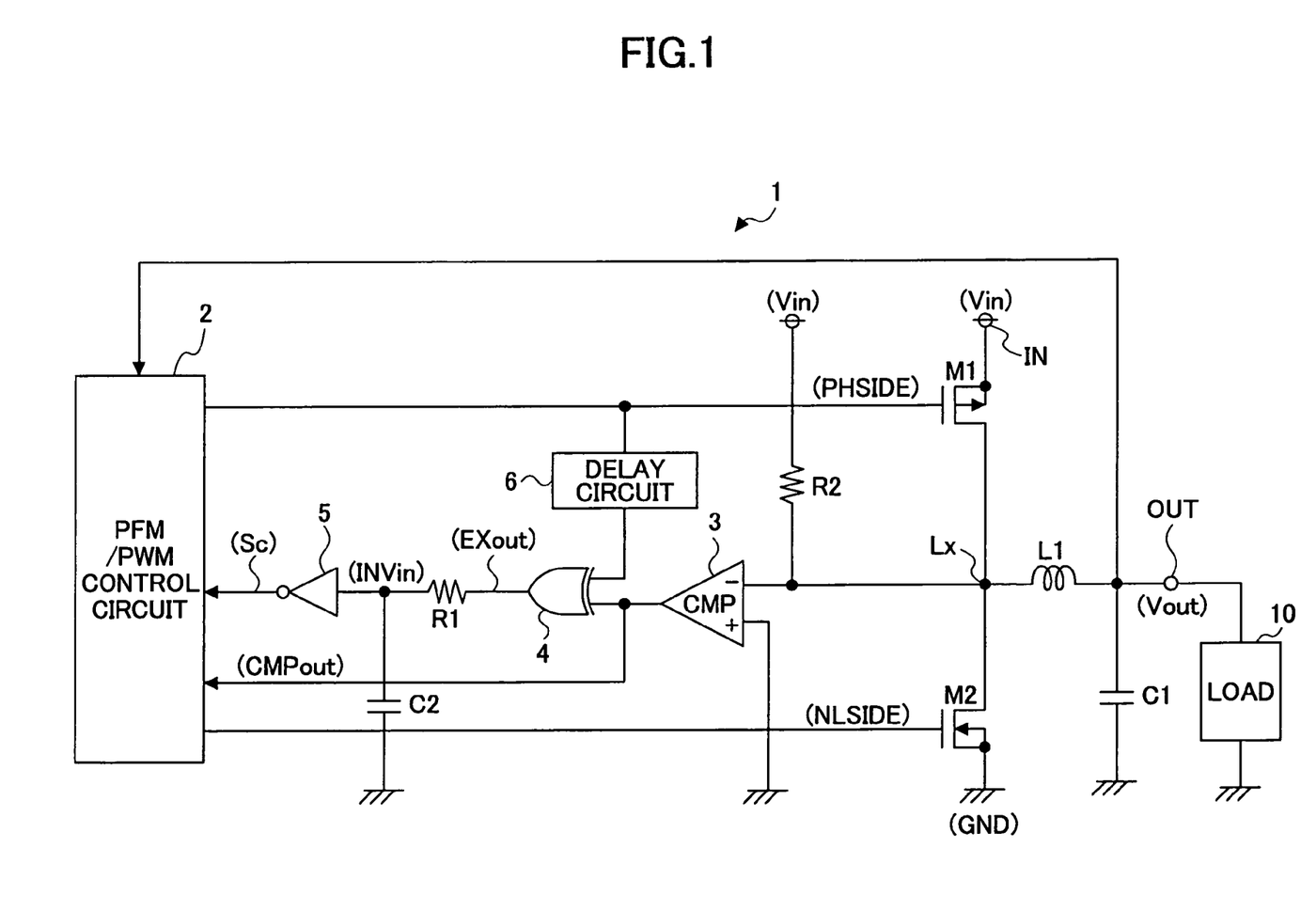
FIG. 1 is a circuit diagram showing a switching regulator according to a first embodiment of the present invention.

FIG. 1 is a circuit diagram showing a switching regulator 1 according to a first embodiment of the present invention.

Referring to FIG. 1, the switching regulator 1 is a non-isolated switching regulator using an inductor, where an input voltage Vin input to an input terminal IN is converted into a predetermined constant voltage to be output from an output terminal OUT to a load 10 as an output voltage Vout.

The switching regulator 1 includes a switching transistor M1 formed of a PMOS transistor and a transistor for synchronous rectification (synchronous rectification transistor) M2 formed of an NMOS transistor. The switching transistor M1 performs switching for output control of the input voltage Vin.

The switching regulator 1 further includes a PFM/PWM control circuit 2, a comparator 3, an exclusive OR circuit 4, an inverter 5, a delay circuit 6, resistors R1 and R2, capacitors C1 and C2, and an inductor L1.

The comparator 3 may form a voltage comparator circuit part. The exclusive OR circuit 4, the inverter 5, the delay circuit 6, the resistor R1 and the capacitor C2 may form a phase comparator circuit. The PFM/PWM control circuit 2 may form a control circuit part. The resistor R1 and the capacitor C2 may form an integrating circuit. Further, the inverter 5 may form a binary conversion (binarizing) circuit.

In the switching regulator 1, the circuits except the inductor L1 and the capacitor C1 may be integrated into a single IC. In some cases, the circuits except the switching transistor M1, the synchronous rectification transistor M2, the inductor L1 and the capacitor C1 may be integrated into a single IC.

The switching transistor M1 and the synchronous rectification transistor M2 are connected in series between the input terminal IN and ground GND. The inductor L1 is connected between the output terminal OUT and a connection Lx of the switching transistor M1 and the synchronous rectification transistor M2. The capacitor C1 is connected between the output terminal OUT and ground GND.

The inverting input of the comparator 3 is connected to the connection Lx and pulled up to the input voltage Vin by the resistor R2. The non-inverting input of the comparator 3 is connected to ground GND. The comparator 3 compares a voltage at the connection Lx and ground (GND) voltage (potential), and outputs a signal CMPout showing the result of the voltage comparison to the PFM/PWM control circuit 2 and one of the inputs of the exclusive OR circuit 4.

The delay circuit 6 is connected between the gate of the switching transistor M1 and the other input of the exclusive OR circuit 4. The output of the exclusive OR circuit 4 is connected to the PFM/PWM control circuit 2 through the resistor R1 and the inverter 5. The capacitor C2 is connected between the connection of the resistor R1 and the input of the inverter 5 and ground GND. The resistor R1 and the capacitor C2 form an integrating circuit, and the integrating circuit and the exclusive OR circuit 4 form a phase comparator.

The gate of each of the switching transistor M1 and the synchronous rectification transistor M2 is connected to the PFM/PWM control circuit 2. The PFM/PWM control circuit 2 selects one of PFM control and PWM control in accordance with a switch signal Sc input thereto from the inverter 5, and outputs a control signal PHSIDE to the gate of the switching transistor M1 and a control signal NLSIDE to the gate of the synchronous rectification transistor M2 in accordance with the selected control method.

The output signal CMPout of the comparator 3 for detecting a discontinuous mode is input to the PFM/PWM control circuit 2. In the discontinuous mode, an idle state, where each of the switching transistor M1 and the synchronous rectification transistor M2 is turned OFF to be cut off, occurs during a single frame of a control cycle.

When the PFM/PWM control circuit 2 detects entering the discontinuous mode from the output signal CMPout, the PFM/PWM control circuit 2 sets the control signal NLSIDE LOW (low-level) in order to turn OFF the synchronous rectification transistor M2.

Further, the output voltage Vout is input to the PFM/PWM control circuit 2. The PFM/PWM control circuit 2 compares a predetermined voltage generated therein and the input output voltage Vout, and controls switching of each of the switching transistor M1 and the synchronous rectification transistor M2 so that the output voltage Vout is the predetermined voltage.

In this configuration, the switching regulator 1 has two operational modes: a continuous mode and the above-described discontinuous mode.

In the continuous mode, a large load current is output from the output terminal OUT to the load 10. When the switching transistor M1 is ON, a large current flows to the inductor L, so that much energy is stored in the inductor L1. Accordingly, it is possible to continue to supply current to the load 10 from the inductor L1 while the switching transistor M1 is OFF.

Figure 2:
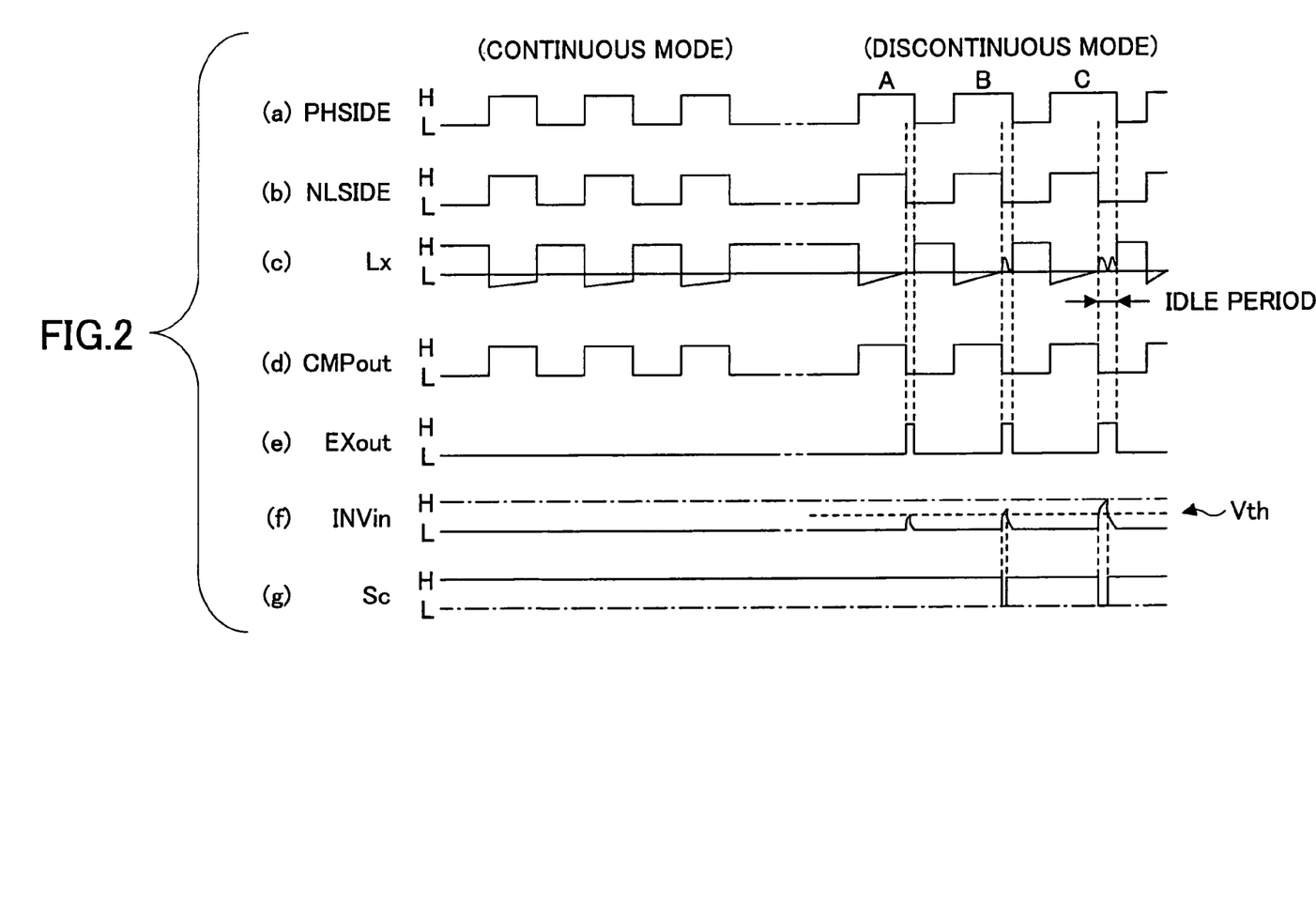
FIG. 2 is a waveform chart showing waveforms at the time of a continuous mode and a discontinuous mode according to the first embodiment of the present invention.

FIG. 2 is a waveform chart showing waveforms at the time of the continuous mode and the discontinuous mode.

A description is given first of operations at the time of the continuous mode in FIG. 2.

At the time of the continuous mode, the control signal PHSIDE (FIG. 2(a)) and the control signal NLSIDE (FIG. 2(b)) are substantially in phase. Therefore, the synchronous rectification transistor M2 is OFF when the switching transistor M1 is ON, and the synchronous rectification transistor M2 is ON when the switching transistor M1 is OFF.

When the switching transistor M1 is ON, the voltage at the connection Lx (FIG. 2(c)) is HIGH (high-level). When the switching transistor M1 turns OFF, the voltage at the connection Lx is reduced to a negative voltage because of the counterelectromotive force of the inductor L1. However, since the synchronous rectification transistor M2 turns ON, the voltage at the connection Lx is clamped to a voltage slightly lower than ground (GND) potential. In this condition, the energy stored in the inductor L1 is supplied to the output terminal OUT by current flowing from ground GND through the inductor L1, so that the current continuously flows from the inductor L1 until the switching transistor M1 turns ON next time.

Next, a description is given of operations at the time of the discontinuous mode.

When the load current is reduced, the current flowing to the inductor L1 is also reduced, so that the energy to be stored in the inductor L1 is also reduced. Therefore, after the switching transistor M1 turns OFF, all the energy stored in the inductor L1 is released before the switching transistor M1 turns ON next time. As a result, the electric charge of the capacitor C1 connected to the output terminal OUT is discharged to ground GND through the synchronous rectification transistor M2, thus extremely reducing efficiency.

In this situation, the voltage at the connection Lx becomes positive, so that the signal level of the output signal CMPout (FIG. 2(d)) of the comparator 3 is inverted to LOW. The low-level output signal CMPout is input to the PFM/PWM control circuit 2, so that the PFM/PWM control circuit 2 sets the control signal NLSIDE LOW so as to turn OFF the synchronous rectification transistor M2, thereby preventing a decrease in efficiency due to reverse current.

Letting the period from when the voltage at the connection Lx becomes positive to when the switching transistor M1 turns ON next time be an idle period, the operations of one frame at the time of the discontinuous mode is composed of the ON-period of the switching transistor M1, the ON-period of the synchronous rectification transistor M2, and the idle period.

Thus, the point of time at which the discontinuous mode starts is determined by the load current, and the length of the idle period varies in accordance with the load current.

When the idle period becomes longer than a predetermined period of time, the PFM/PWM control circuit 2 switches from PWM control to PFM control.

Both of the switching transistor M1 and the synchronous rectification transistor M2 are OFF during the idle period. Accordingly, the idle period can be checked by detecting the difference in phase between the control signal PHSIDE and the control signal NLSIDE. In the discontinuous mode, however, the control signal NLSIDE and the output signal CMPout of the comparator 3 are substantially in phase as shown in FIG. 2, but the control signal NLSIDE is delayed in phase by the time of processing by the PFM/PWM control circuit 2. Therefore, the phase difference between the control signal PHSIDE and the output signal CMPout of the comparator 3 is detected in the switching regulator 1.

The control signal PHSIDE and the output signal CMPout are input to the corresponding inputs of the exclusive OR circuit 4 in order to detect the phase difference between the control signal PHSIDE and the output signal CMPout. The delay circuit 6 cancels delay in the comparator 3 detecting a change in the voltage at the connection Lx after the switching transistor M1 turns ON or OFF in response to the control signal PHSIDE.

At the time of the continuous mode, since the control signal PHSIDE and the output signal CMPout are in phase, an output signal EXout (FIG. 2(e)) of the exclusive OR circuit 4 remains LOW (low-level) as shown in FIG. 2. The output signal EXout is input to the inverter 5 through the integrating circuit of the resistor R1 and the capacitor C2, and has its signal level inverted in the inverter 5 to be input to the PFM/PWM control circuit 2 as the high-level switch signal Sc (FIG. 2(g)).

In the discontinuous mode, there occurs the idle period in which the output signal CMPout of the comparator 3 becomes LOW while the control signal PHSIDE is HIGH. Referring to FIG. 2, idle periods are in increasing order from A to B to C.

In the case of A where the idle period is short, the output signal EXout of the exclusive OR circuit 4 is HIGH for such a short period that the integrating circuit of the resistor R1 and the capacitor C1 keeps an input voltage INVin (FIG. 2(f)) to the inverter 5 from rising to a threshold voltage Vth of the inverter 5. As a result, the switch signal Sc remains HIGH.

In the case of B and C, the idle period increases, and the output signal EXout of the exclusive OR circuit 4 is HIGH for a longer period. As a result, the input voltage INVin exceeds the threshold voltage Vth of the inverter 5, so that a low-level pulse is generated in the switch signal Sc. When the switch signal Sc becomes LOW, the PFM/PWM control circuit 2 latches the low-level switch signal Sc for at least one frame, and switches the control mode from PWM control to PFM control.

PFM control may be switched to PWM control if the low-level pulse superposed on the switch signal Sc is not detected in the next frame, if the low-level pulse superposed on the switch signal Sc is not detected for a predetermined number of frames, or if the low-level pulse superposed on the switch signal Sc is detected after its detection is prevented for a predetermined period of time since its detection. The condition for switching PFM control to PWM control may be determined in accordance with the purpose of use of the switching regulator.

Thus, according to the switching regulator 1 of the first embodiment, the length of the idle period for switching PWM control to PFM control can be determined based on the time constant of the integrating circuit formed of the resistor R1 and the capacitor C2. The time constant of the integrating circuit may be determined so that a low-level pulse is generated in the switch signal Sc when the idle period has passed a time corresponding to a desired load current serving as a reference for determination in switching PWM control to PFM control. Thus, a load current at the time of switching PWM control to PFM control in accordance with a load condition can be determined with accuracy without using a resistor for output current detection.

Second Embodiment

Figure 3:
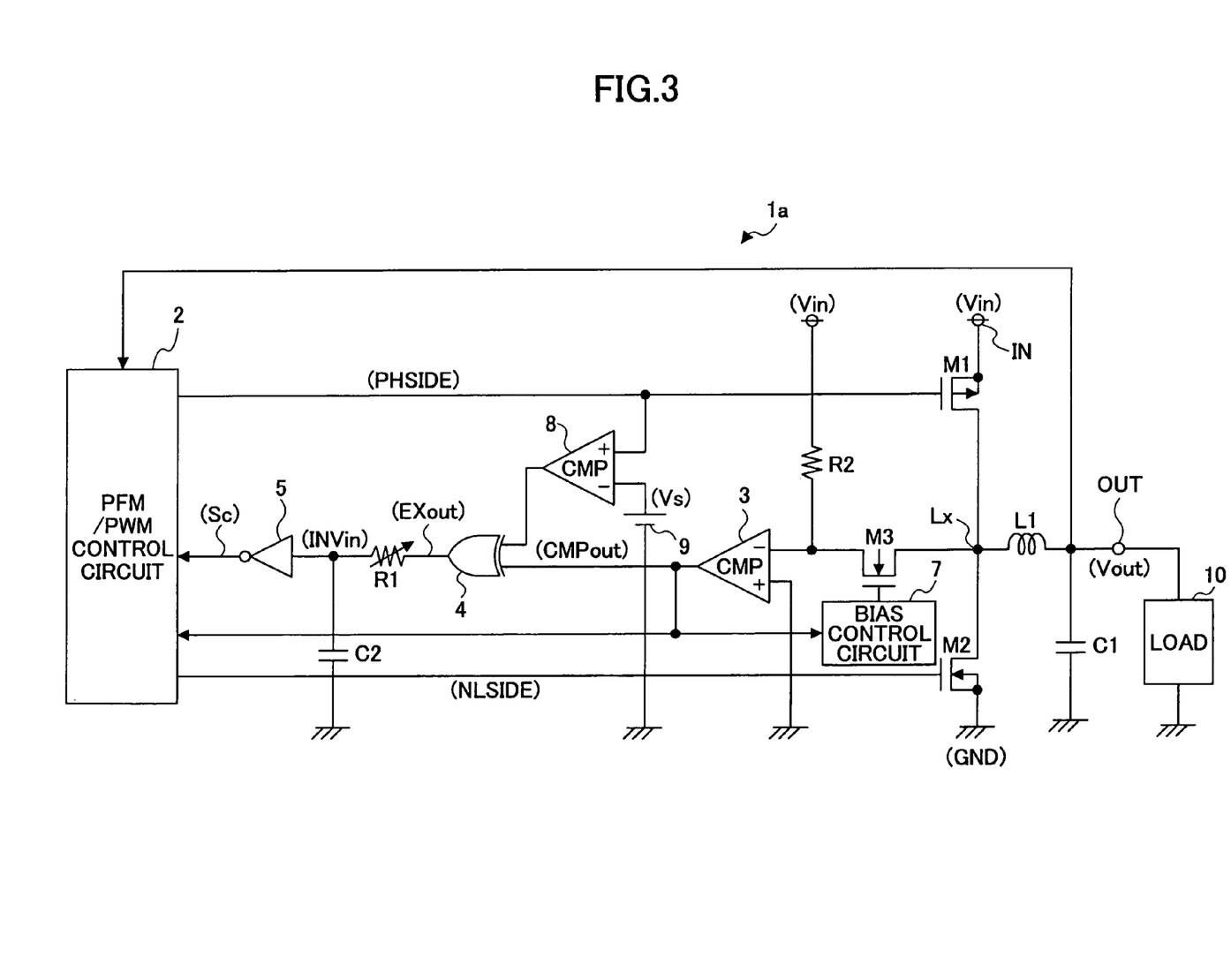
FIG. 3 is a circuit diagram showing a switching regulator according to a second embodiment of the present invention.

FIG. 3 is a circuit diagram showing a switching regulator 1a according to a second embodiment of the present invention. In FIG. 3, the same elements as those of FIG. 1 are referred to by the same reference numerals, and a description thereof is omitted.

The switching regulator 1a of FIG. 3 is different from the switching regulator 1 of FIG. 1 in that an NMOS transistor M3 is inserted between the connection Lx and the inverting input of the comparator 3, that a bias control circuit 7 that controls the operation of the NMOS transistor M3 is added, that a comparator 8 and a reference voltage generator circuit 9 that generates a predetermined reference voltage Vs replace the delay circuit 6 of FIG. 1, and that the resistor R1 is a variable resistor.

Referring to FIG. 3, the switching regulator 1a is a non-insulated switching regulator using an inductor, where an input voltage Vin input to the input terminal IN is converted into a predetermined constant voltage to be output from the output terminal OUT to the load 10 as an output voltage Vout.

The switching regulator 1a includes the switching transistor M1, the synchronous rectification transistor M2, the PFM/PWM control circuit 2, the comparators 3 and 8, the exclusive OR circuit 4, the inverter 5, the bias control circuit 7, the reference voltage generator circuit 9, the NMOS transistor M3, the resistors R1 and R2, the capacitors C1 and C2, and the inductor L1.

The NMOS transistor M3 may form a variable resistance element. The bias control circuit 7 may form a resistance control circuit.

In the switching regulator 1a, the circuits except the inductor L1 and the capacitor C1 may be integrated into a single IC. In some cases, the circuits except the switching transistor M1, the synchronous rectification transistor M2, the inductor L1 and the capacitor C1 may be integrated into a single IC.

The NMOS transistor M3 is connected between the inverting input of the comparator 3 and the connection Lx. The gate of the NMOS transistor M3 is connected to the bias control circuit 7.

The control signal PHSIDE is input to the non-inverting input of the comparator 8. The reference voltage Vs is input to the inverting input of the comparator 8. The output of the comparator 8 is connected to a corresponding one of the inputs of the exclusive OR circuit 4.

The output signal CMPout of the comparator 3 is input to the bias control circuit 7. The bias control circuit 7 outputs a voltage corresponding to the output signal CMPout to the gate of the NMOS transistor M3.

In this configuration, when the voltage at the connection Lx is low, a bias voltage from the bias control circuit is input to the gate of the NMOS transistor M3 so that the NMOS transistor M3 is ON, and the voltage at the connection Lx is input to the inverting input of the comparator 3. The pull-up resistor R2 has high resistance, and does not affect the operation when the NMOS transistor M3 is ON.

When the voltage at the connection Lx increases so that the comparator 3 outputs a signal indicating that the voltage at the connection Lx exceeds a predetermined value, the bias control circuit 7 controls the gate voltage of the NMOS transistor M3 so as to increase the on-resistance of the NMOS transistor M3. Since the on-resistance of the NMOS transistor M3 increases, the voltage at the inverting input of the comparator 3 rapidly increases because of the pull-up resistor R2. At this point, the output signal CMPout of the comparator 3 reduces the output voltage of the bias control circuit 7, thereby causing positive feedback. As a result, the output signal CMPout of the comparator 3 can be rapidly reduced, thus making it possible to increase response speed.

Here, the comparator 8 is the same element and has the same circuit configuration as the comparator 3. By inputting the control signal PHSIDE to the comparator 8, the comparator 8 can have the same delay as the delay generated by the comparator 3, so that it is possible to compare phases with more accuracy.

The resistance of the resistor R1 forming the integrating circuit can be set to a desired value by laser trimming. As a result, the time constant of the integrating circuit formed of the resistor R1 and the capacitor C2 can be determined as desired, so that a load current value serving as a reference in determining that PWM control be switched to PFM control can be determined as desired.

Thus, according to the switching regulator 1a of the second embodiment, the idle period is detected by comparing the phase of the control signal PHSIDE and the phase of the output signal CMPout of the comparator 3 for discontinuous mode detection, and the idle period is masked by the integrating circuit for a predetermined period of time. As a result, it is possible to accurately determine a load current value at which PWM control is switched to PFM control.

In the first and second embodiments, synchronous rectification switching regulators are shown by way of example. However, the present invention may also be applied to asynchronous switching regulators using a diode in place of the synchronous rectification transistor M2. In this case, the circuit configuration is the same as those of FIGS. 1 and 3 except that the synchronous rectification transistor M2 is replaced with a diode having its cathode connected to the connection Lx and its anode connected to ground GND, and accordingly, a description thereof is omitted.

Further, in the first and second embodiments, a description is given, by way of example, of the case where the PFM/PWM control circuit 2 switches between PFM control and PWM control. Alternatively, VFM control may be performed in place of PFM control.

Figure 4:
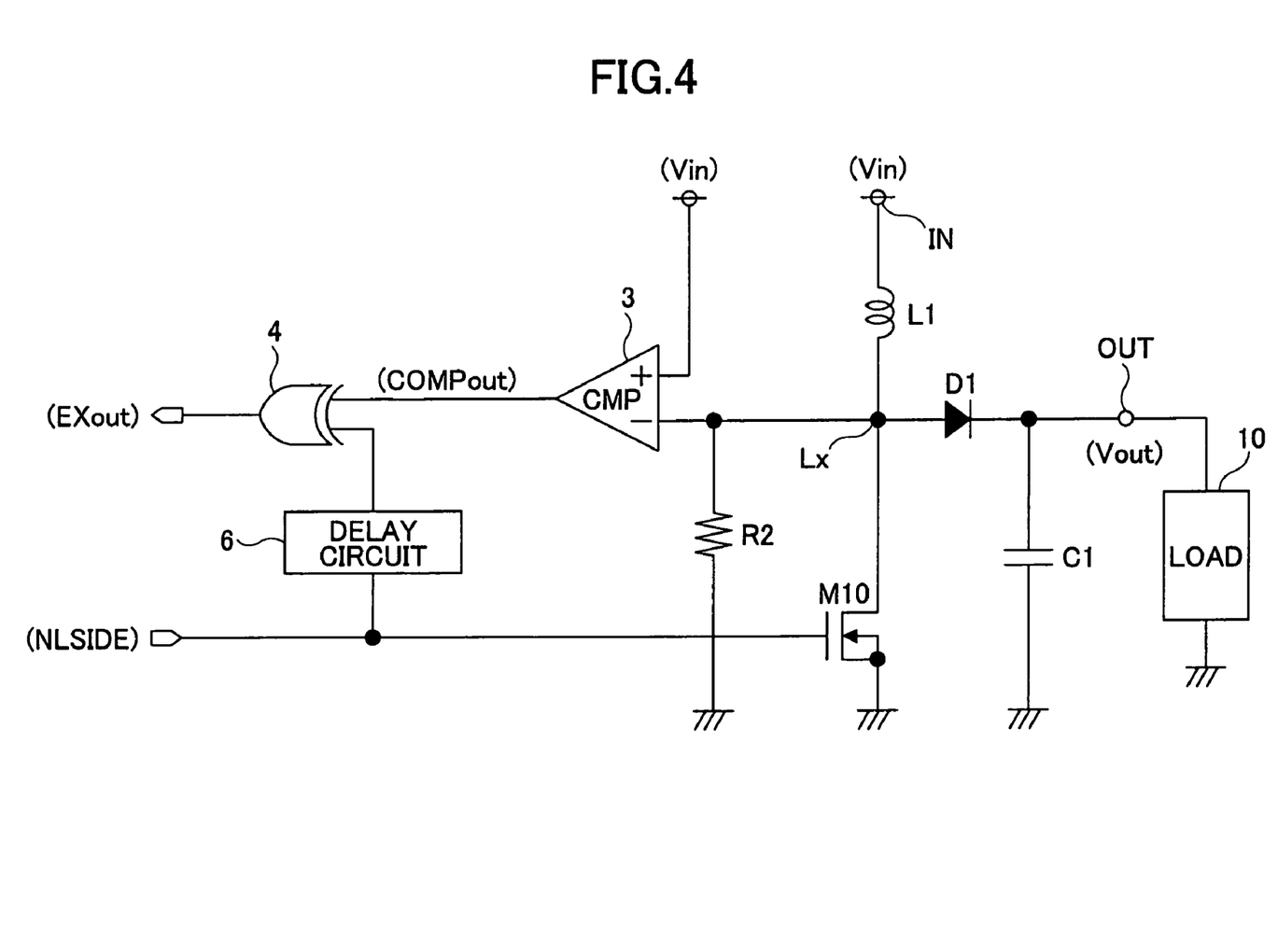
FIG. 4 is a circuit diagram showing a variation of the switching regulator of the first embodiment of the present invention.

Further, in the first and second embodiments, step-down switching regulators are shown by way of example. However, the present invention is not limited to these, and may also be applied to step-up switching regulators. In this case, the switching regulator 1 of FIG. 1 may be as shown in FIG. 4. FIG. 4 depicts voltage detection at the connection Lx through before the integrating circuit. FIG. 4 is the same as FIG. 1 in the remaining parts, of which description is therefore omitted.

Referring to FIG. 4, the resistor R2 is changed from the pull-up resistor of FIG. 1 to a pull-down resistor; instead of ground (GND) potential, the input voltage Vin is input to the non-inverting input of the comparator 3; and the input signal to the corresponding input of the exclusive OR circuit 4 through the delay circuit 6 is changed from the control signal PHSIDE to the control signal NLSIDE.

The switching transistor M1 of FIG. 1 corresponds to a switching transistor M10 of FIG. 4 formed of an NMOS transistor. The synchronous rectification transistor M2 corresponds to a diode D1 of FIG. 4. The switching regulator of FIG. 4 is the same as the switching regulator 1 of FIG. 1 except for performing a step-up operation in place of a step-down operation in the case of FIG. 1, and accordingly, a description thereof is omitted.

Thus, according to one embodiment of the present invention, there is provided a switching regulator converting a voltage input to an input terminal into a predetermined constant voltage and outputting the converted voltage from an output terminal, the switching regulator including a switching transistor configured to perform switching in accordance with an input control signal; an inductor charged with the input voltage by the switching of the switching transistor; a voltage comparator circuit part configured to compare a voltage at the connection of the switching transistor and the inductor and a predetermined voltage, and to generate and output a binary signal indicating the result of the comparison; a phase comparator circuit part configured to compare the phase of the control signal input to the control electrode of the switching transistor and the phase of the output signal of the voltage comparator circuit part, and to generate and output a signal indicating the result of the comparison; and a control circuit part configured to perform one of a first control and a second control on the switching transistor in accordance with the output signal of the phase comparator circuit part so that the output voltage output from the output terminal is the predetermined constant voltage, the first control being PWM control and the second control being one of PFM control and VFM control, wherein the control circuit part is configured to perform PWM control in response to the output signal of the phase comparator circuit part indicating that the control signal and the output signal of the voltage comparator circuit part are in phase, and to perform the one of PFM control and VFM control in response to the output signal of the phase comparator circuit part indicating that the control signal and the output signal of the voltage comparator circuit part are out of phase.

Additionally, in the switching regulator as set forth above, the phase comparator circuit part may be configured to determine that the control signal and the output signal of the voltage comparator circuit part are in phase in response to the difference between the phases thereof being less than a predetermined value.

Additionally, in the switching regulator as set forth above, the phase comparator circuit part may be capable of determining the predetermined value as desired.

Additionally, in the switching regulator as set forth above, the phase comparator circuit part may include an exclusive OR circuit having a first input to which the control signal input to the control electrode of the switching transistor is input and a second input to which the output signal of the voltage comparator circuit part is input; an integrating circuit configured to integrate and output the output signal of the exclusive OR circuit; and a binary conversion circuit configured to convert the output signal of the integrating circuit into a binary signal and output the binary signal to the control circuit part.

Additionally, in the switching regulator as set forth above, the phase comparator circuit part may further include a delay circuit configured to delay the control signal input to the control electrode of the switching transistor, and to output the delayed control signal to the first input of the exclusive OR circuit.

Additionally, in the switching regulator as set forth above, the delay circuit may include a comparator configured to compare the voltage of the control signal input to the control electrode of the switching transistor and a predetermined reference voltage, the comparator being equal to a comparator forming the voltage comparator circuit part.

Additionally, in the switching regulator as set forth above, an input of the voltage comparator circuit part to which the voltage at the connection of the switching transistor and the inductor is input may be pulled up or pulled down.

Additionally, the switching regulator as set forth above may further include a variable resistance element connected between the connection of the switching transistor and the inductor and the input of the voltage comparator circuit part to which the voltage at the connection is input, the variable resistance element being configured to vary a resistance in accordance with an input control signal; and a resistance control circuit configured to control the resistance of the variable resistance element in accordance with the output signal of the voltage comparator circuit part, wherein the resistance control circuit may be configured to increase the resistance of the variable resistance element in response to the output signal of the voltage comparator circuit part indicating that the voltage at the connection of the switching transistor and the inductor is higher than a predetermined value.

Additionally, in the switching regulator as set forth above, the variable resistance element may be a transistor whose on-resistance varies in accordance with the control signal input to the control electrode thereof, the control signal being fed from the resistance control circuit.

Additionally, in the switching regulator as set forth above, the integrating circuit may include a resistor having a first end thereof connected to the output of the exclusive OR circuit; and a capacitor connected to a second end of the resistor, the capacitor being charged and discharged through the resistor.

Additionally, in the switching regulator as set forth above, the resistor may be capable of being set to a desired resistance by trimming.

According to one embodiment of the present invention, there is provided a control circuit of a switching regulator, the switching regulator converting a voltage input to an input terminal into a predetermined constant voltage and outputting the converted voltage from an output terminal, the switching regulator including a switching transistor performing switching in accordance with an input control signal; and an inductor charged with the input voltage by the switching of the switching transistor, wherein the switching of the switching transistor is controlled so that the output voltage output from the output terminal is the predetermined constant voltage, the control circuit including a voltage comparator circuit part configured to compare a voltage at the connection of the switching transistor and the inductor and a predetermined voltage, and to generate and output a binary signal indicating the result of the comparison; a phase comparator circuit part configured to compare the phase of the control signal input to the control electrode of the switching transistor and the phase of the output signal of the voltage comparator circuit part, and to generate and output a signal indicating the result of the comparison; and a control circuit part configured to perform one of a first control and a second control on the switching transistor in accordance with the output signal of the phase comparator circuit part so that the output voltage output from the output terminal is the predetermined constant voltage, the first control being PWM control and the second control being one of PFM control and VFM control, wherein the control circuit part is configured to perform PWM control in response to the output signal of the phase comparator circuit part indicating that the control signal and the output signal of the voltage comparator circuit part are in phase, and to perform the one of PFM control and VFM control in response to the output signal of the phase comparator circuit part indicating that the control signal and the output signal of the voltage comparator circuit part are out of phase.

Additionally, in the control circuit as set forth above, the phase comparator circuit part may be configured to determine that the control signal and the output signal of the voltage comparator circuit part are in phase in response to the difference between the phases thereof being less than a predetermined value.

Additionally, in the control circuit as set forth above, the phase comparator circuit part may be capable of determining the predetermined value as desired.

Additionally, in the control circuit as set forth above, the phase comparator circuit part may include an exclusive OR circuit having a first input to which the control signal input to the control electrode of the switching transistor is input and a second input to which the output signal of the voltage comparator circuit part is input; an integrating circuit configured to integrate and output the output signal of the exclusive OR circuit; and a binary conversion circuit configured to convert the output signal of the integrating circuit into a binary signal and output the binary signal to the control circuit part.

Additionally, in the control circuit as set forth above, the phase comparator circuit part may further include a delay circuit configured to delay the control signal input to the control electrode of the switching transistor, and to output the delayed control signal to the first input of the exclusive OR circuit.

Additionally, in the control circuit as set forth above, the delay circuit may include a comparator configured to compare the voltage of the control signal input to the control electrode of the switching transistor and a predetermined reference voltage, the comparator being equal to a comparator forming the voltage comparator circuit part.

Additionally, in the control circuit as set forth above, an input of the voltage comparator circuit part to which the voltage at the connection of the switching transistor and the inductor is input may be pulled up or pulled down.

Additionally, the control circuit as set forth above may further include a variable resistance element connected between the connection of the switching transistor and the inductor and the input of the voltage comparator circuit part to which the voltage at the connection is input, the variable resistance element being configured to vary a resistance in accordance with an input control signal; and a resistance control circuit configured to control the resistance of the variable resistance element in accordance with the output signal of the voltage comparator circuit part, wherein the resistance control circuit may be configured to increase the resistance of the variable resistance element in response to the output signal of the voltage comparator circuit part indicating that the voltage at the connection of the switching transistor and the inductor is higher than a predetermined value.

Additionally, in the control circuit as set forth above, the variable resistance element may be a transistor whose on-resistance varies in accordance with the control signal input to the control electrode thereof, the control signal being fed from the resistance control circuit.

Additionally, in the control circuit as set forth above, the integrating circuit may include a resistor having a first end thereof connected to the output of the exclusive OR circuit; and a capacitor connected to a second end of the resistor, the capacitor being charged and discharged through the resistor.

Additionally, in the control circuit as set forth above, the resistor may be capable of being set to a desired resistance by trimming.

According to one embodiment of the present invention, there is provided a method of controlling the operation of a switching regulator, the switching regulator converting a voltage input to an input terminal into a predetermined constant voltage and outputting the converted voltage from an output terminal, the switching regulator including a switching transistor performing switching in accordance with an input control signal; and an inductor charged with the input voltage by the switching of the switching transistor, wherein the switching of the switching transistor is controlled so that the output voltage output from the output terminal is the predetermined constant voltage, the control method including the steps of (a) comparing a voltage at the connection of the switching transistor and the inductor and a predetermined voltage; (b) comparing the phase of the control signal input to the control electrode of the switching transistor and the phase of a binary signal indicating the result of step (a); and (c) performing PWM control on the switching transistor in response to the result of step (b) indicating that the control signal and the binary signal are in phase, and performing one of PFM control and VFM control in response to the result of step (b) indicating that the control signal and the binary signal are out of phase.

According to the above-described switching regulator, control circuit thereof, and method of controlling operations thereof according to the present invention, the voltage at the connection of the switching regulator and the inductor is compared with a predetermined voltage, and the phase of a control signal input to the control electrode of the switching transistor is compared with the phase of a binary signal indicating the result of the voltage comparison. If the control signal and the binary signal are in phase, PWM control is performed on the switching transistor. If the control signal and the binary signal are out of phase, PFM control or VFM control is performed on the switching transistor. As a result, a load current at the time of switching between PWM control and PFM or VFM control in accordance with a load condition can be set or determined with accuracy without using a resistor for output current detection.

Further, according to the switching regulator and the control circuit thereof of the present invention, the difference in phase between the control signal and the binary signal in determining that the control signal and the binary signal are in phase can be determined as desired by adjusting the time constant of the integrating circuit. Therefore, a load current at the time of switching control methods can be set to a desired current value.

Further, the input of the voltage comparator circuit part to which the voltage at the connection of the switching transistor and the inductor is input is pulled up or pulled down. Accordingly, the operating speed of the voltage comparator circuit part can be increased. Further, by adding a variable resistance element to the input of the voltage comparator circuit part, it is possible to reduce a pull-up or pull-down current.

The present invention is not limited to the specifically disclosed embodiments, and variations and modifications may be made without departing from the scope of the present invention.

The present application is based on Japanese Priority Patent Application No. 2006-246784, filed on Sep. 12, 2006, the entire contents of which are hereby incorporated by reference.

What is claimed is:

1. A switching regulator converting a voltage input to an input terminal into a predetermined constant voltage and outputting the converted voltage from an output terminal, the switching regulator comprising:
    a switching transistor configured to perform switching in accordance with an input control signal;
    an inductor charged with an input voltage by the switching of the switching transistor;
    a voltage comparator circuit part configured to compare a voltage at a connection of the switching transistor and the inductor and a predetermined voltage, and to generate and output a binary signal indicating a result of the comparison;
    a phase comparator circuitpart configured to compare a phase of the control signal input to a control electrode of the switching transistor and a phase of the output signal of the voltage comparator circuit part, and to generate and output a signal indicating a result of the comparison; and
    a control circuit part configured to perform one of a first control and a second control on the switching transistor in accordance with the output signal of the phase comparator circuit part so that the output voltage output from the output terminal is the predetermined constant voltage, the first control being a PWM control and the second control being one of a PFM control and a VFM control,
    wherein the control circuit part is configured to perform the PWM control in response to the output signal of the phase comparator circuit part indicating that the control signal and the output signal of the voltage comparator circuit part are in phase, and to perform the one of the PFM control and the VFM control in response to the output signal of the phase comparator circuit part indicating that the control signal and the output signal of the voltage comparator circuit part are out of phase, and
    wherein the phase comparator circuit part is configured to determine that the control signal and the output signal of the voltage comparator circuit part are in phase in response to a difference between the phases thereof being less than a predetermined value.

2. The switching regulator as claimed in claim 1, wherein the phase comparator circuit part is capable of determining the predetermined value as desired.

3. The switching regulator as claimed in claim 1, wherein the phase comparator circuit part comprises:
    an exclusive OR circuit having a first input to which the control signal input to the control electrode of the switching transistor is input and a second input to which the output signal of the voltage comparator circuit part is input;
    an integrating circuit configured to integrate and output an output signal of the exclusive OR circuit; and
    a binary conversion circuit configured to convert the output signal of the integrating circuit into a binary signal and output the binary signal to the control circuit part.

4. The switching regulator as claimed in claim 3, wherein the phase comparator circuit part further comprises:
    a delay circuit configured to delay the control signal input to the control electrode of the switching transistor, and to output the delayed control signal to the first input of the exclusive OR circuit.

5. The switching regulator as claimed in claim 4, wherein the delay circuit comprises:
    a comparator configured to compare a voltage of the control signal input to the control electrode of the switching transistor and a predetermined reference voltage, the comparator being equal to a comparator forming the voltage comparator circuit part.

6. The switching regulator as claimed in claim 1, wherein an input of the voltage comparator circuit part to which the voltage at the connection of the switching transistor and the inductor is input is pulled up or pulled down.

7. The switching regulator as claimed in claim 6, further comprising:
    a variable resistance element connected between the connection of the switching transistor and the inductor and the input of the voltage comparator circuit part to which the voltage at the connection is input, the variable resistance element being configured to vary a resistance in accordance with an input control signal; and
    a resistance control circuit configured to control the resistance of the variable resistance element in accordance with the output signal of the voltage comparator circuit part,
    wherein the resistance control circuit is configured to increase the resistance of the variable resistance element in response to the output signal of the voltage comparator circuit part indicating that the voltage at the connection of the switching transistor and the inductor is higher than a predetermined value.

8. The switching regulator as claimed in claim 7, wherein the variable resistance element is a transistor whose on-resistance varies in accordance with the control signal input to a control electrode thereof, the control signal being fed from the resistance control circuit.

9. The switching regulator as claimed in claim in claim 3, wherein the integrating circuit comprises:
a resistor having a first end thereof connected to an output of the exclusive OR circuit; and
a capacitor connected to a second end of the resistor, the capacitor being charged and discharged through the resistor.

10. The switching regulator as claimed in claim 9, wherein the resistor is capable of being set to a desired resistance by trimming.

11. A control circuit of a switching regulator, the switching regulator converting a voltage input to an input terminal into a predetermined constant voltage and outputting the converted voltage from an output terminal, the switching regulator including a switching transistor performing switching in accordance with an input control signal; and an inductor charged with an input voltage by the switching of the switching transistor, wherein the switching of the switching transistor is controlled so that the output voltage output from the output terminal is the predetermined constant voltage, the control circuit comprising:
a voltage comparator circuit part configured to compare a voltage at a connection of the switching transistor and the inductor and a predetermined voltage, and to generate and output a binary signal indicating a result of the comparison;
a phase comparator circuit part configured to compare a phase of the control signal input to a control electrode of the switching transistor and aphase of the output signal of the voltage comparator circuit part, and to generate and output a signal indicating a result of the comparison; and
a control circuit part configured to perform one of a first control and a second control on the switching transistor in accordance with the output signal of the phase comparator circuit part so that the output voltage output from the output terminal is the predetermined constant voltage, the first control being a PWM control and the second control being one of a PFM control and a VFM control,
wherein the control circuit part is configured to perform the PWM control in response to the output signal of the phase comparator circuit part indicating that the control signal and the output signal of the voltage comparator circuit part are in phase, and to perform the one of the PFM control and the VFM control in response to the output signal of the phase comparator circuit part indicating that the control signal and the output signal of the voltage comparator circuit part are out of phase, and
wherein the phase comparator circuit part is configured to determine that the control signal and the output signal of the voltage comparator circuit part are in phase in response to a difference between the phases thereof being less than a predetermined value.

12. The control circuit as claimed in claim 11, wherein the phase comparator circuit part is capable of determining the predetermined value as desired.

13. The control circuit as claimed in claim 11, wherein the phase comparator circuit part comprises:
an exclusive OR circuit having a first input to which the control signal input to the control electrode of the switching transistor is input and a second input to which the output signal of the voltage comparator circuit part is input;
an integrating circuit configured to integrate and output an output signal of the exclusive OR circuit; and
a binary conversion circuit configured to convert the output signal of the integrating circuit into a binary signal and output the binary signal to the control circuit part.

14. The control circuit as claimed in claim 13, wherein the phase comparator circuit part further comprises:
a delay circuit configured to delay the control signal input to the control electrode of the switching transistor, and to output the delayed control signal to the first input of the exclusive OR circuit.

15. The control circuit as claimed in claim 14, wherein the delay circuit comprises:
a comparator configured to compare a voltage of the control signal input to the control electrode of the switching transistor and a predetermined reference voltage, the comparator being equal to a comparator forming the voltage comparator circuit part.

16. The control circuit as claimed in claim in claim 13, wherein the integrating circuit comprises:
a resistor having a first end thereof connected to an output of the exclusive OR circuit; and
a capacitor connected to a second end of the resistor, the capacitor being charged and discharged through the resistor.

17. The control circuit as claimed in claim 16, wherein the resistor is capable of being set to a desired resistance by trimming.

18. The control circuit as claimed in claim 11, wherein an input of the voltage comparator circuit part to which the voltage at the connection of the switching transistor and the inductor is input is pulled up or pulled down.

19. The control circuit as claimed in claim 18, further comprising:
a variable resistance element connected between the connection of the switching transistor and the inductor and the input of the voltage comparator circuit part to which the voltage at the connection is input, the variable resistance element being configured to vary a resistance in accordance with an input control signal; and
a resistance control circuit configured to control the resistance of the variable resistance element in accordance with the output signal of the voltage comparator circuit part,
wherein the resistance control circuit is configured to increase the resistance of the variable resistance element in response to the output signal of the voltage comparator circuit part indicating that the voltage at the connection of the switching transistor and the inductor is higher than a predetermined value.

20. The control circuit as claimed in claim 19, wherein the variable resistance element is a transistor whose on-resistance varies in accordance with the control signal input to a control electrode thereof, the control signal being fed from the resistance control circuit.

21. A method of controlling an operation of a switching regulator, the switching regulator converting a voltage input to an input terminal into a predetermined constant voltage and outputting the converted voltage from an output terminal, the switching regulator including a switching transistor performing switching in accordance with an input control signal; and an inductor charged with an input voltage by the switching of the switching transistor, wherein the switching of the switching transistor is controlled so that the output voltage output from the output terminal is the predetermined constant voltage, the control method comprising steps of:
(a) comparing a voltage at a connection of the switching transistor and the inductor and a predetermined voltage;

(b) comparing a phase of the control signal input to a control electrode of the switching transistor and a phase of a binary signal indicating a result of said step (a);

(bb) determining that a result of a comparison in (b) is that the control signal and the binary signal are in phase in response to a difference between the phases thereof being less than a predetermined value; and (c) performing a PWM control on the switching transistor in response to a determination in (bb) that the control signal and the binary signal are in phase, and performing one of a PFM control and a VFM control in response to the result of said step (b) indicating that the control signal and the binary signal are out of phase.

* * * * *